United States Patent [19]

Hayes et al.

[11] Patent Number: 5,514,871
[45] Date of Patent: May 7, 1996

[54] OPTICAL RADIATION SENSOR DEVICE

[75] Inventors: Stewart J. Hayes; Richard Pearcey; Philip T. White; Peter R. Andreae, all of London; Mark R. Lowenstine, Denfield, all of Canada

[73] Assignee: Trojan Technologies, London, Canada

[21] Appl. No.: 181,205

[22] Filed: Jan. 13, 1994

[51] Int. Cl.[6] .................... G01J 1/42; G01J 1/04
[52] U.S. Cl. ........................................... 250/372
[58] Field of Search ....................... 250/435, 372

[56] References Cited

U.S. PATENT DOCUMENTS

| | | | |
|---|---|---|---|
| 2,413,704 | 12/1944 | Glatthar et al. | 250/42 |
| 2,670,439 | 2/1954 | Darney | 250/43 |
| 3,062,958 | 11/1962 | Warner | 250/372 |
| 3,140,054 | 4/1963 | Ohareno | 240/2.18 |
| 3,182,191 | 5/1965 | McFarland et al. | 250/43 |
| 3,182,193 | 5/1965 | Ellner et al. | 250/43.5 |
| 3,427,489 | 2/1969 | Walsh | 250/372 |
| 3,456,107 | 7/1969 | Robertson | 250/43 |
| 3,462,597 | 8/1969 | Young | 250/43 |
| 3,637,342 | 1/1972 | Veloz | 250/43 |
| 3,837,800 | 9/1974 | Wood | 210/64 |
| 3,924,139 | 12/1975 | Hirose et al. | 250/527 |
| 3,948,772 | 4/1976 | Ellner | 210/96 |
| 4,103,167 | 7/1978 | Ellner | 250/432 |
| 4,204,956 | 5/1980 | Flatow | 210/87 |
| 4,255,663 | 3/1981 | Lewis | 250/436 |
| 4,296,328 | 10/1981 | Regan | 250/436 |
| 4,367,410 | 1/1983 | Wood | 250/431 |
| 4,400,270 | 8/1983 | Hillman | 210/103 |
| 4,435,744 | 3/1984 | Russo | 362/219 |
| 4,471,225 | 9/1984 | Hillman | 250/436 |
| 4,482,809 | 11/1984 | Maarschalkerweerd | 250/436 |
| 4,490,777 | 12/1984 | Tanner et al. | 362/221 |
| 4,535,247 | 8/1985 | Kurtz | 250/436 |
| 4,591,958 | 5/1986 | Lamboo | 362/219 |
| 4,596,935 | 6/1986 | Lumpp | 250/495.1 |
| 4,661,890 | 4/1987 | Watanabe et al. | 362/217 |
| 4,700,101 | 10/1987 | Ellner et al. | 313/1 |
| 4,742,231 | 5/1988 | Bridgen | 250/435 |
| 4,755,292 | 7/1988 | Merriam | 210/192 |
| 4,757,205 | 7/1988 | Latel et al. | 250/435 |
| 4,767,932 | 8/1988 | Ellner | 250/435 |
| 4,825,078 | 4/1989 | Huber et al. | 250/372 |

FOREIGN PATENT DOCUMENTS

| | | | |
|---|---|---|---|
| 4212296 | 2/1911 | France . | |
| 434069 | 1/1912 | France . | |
| 14626 | 1/1912 | France . | |
| 855521 | 11/1952 | Germany . | |
| 2213658 | 10/1973 | Germany . | |
| 3441535 | 6/1986 | Germany | C02F 1/32 |
| 3902028 | 7/1989 | Germany | 250/372 |
| 2136112A | 9/1984 | United Kingdom | G01J 1/42 |

OTHER PUBLICATIONS

Die Katadyn UV–Verfahrer zur Keimreduktior im Abwassen Office National De La Propriete Industrielle, 1st addition, Au Brevet D'invention,

*Primary Examiner*—Jack I. Berman
*Attorney, Agent, or Firm*—Fitzpatrick, Cella, Harper & Sincto

[57] ABSTRACT

An optical radiation sensor comprising a housing having an inlet which allows radiation to enter the housing, and further comprising the following elements serially disposed after the inlet in the path of the radiation: attenuating aperture means, filter means and sensor means. A fluid disinfection system incorporating the sensor is also described.

11 Claims, 3 Drawing Sheets

OPTICAL RADIATION SENSOR DEVICE

BACKGROUND OF THE INVENTION

1. Field of the Invention

The present invention relates to an optical radiation sensor device. More specifically, the present invention relates that an optical radiation sensor device with improved resistance to damage from the radiation which it is employed to measure.

2. Description of the Prior Art

Optical radiation sensors are known and find widespread use in a number of applications. One of the principal applications of optical radiation sensors is in the field of ultraviolet radiation fluid disinfection systems.

It is known that irradiation of water with ultraviolet light will disinfect the water by inactivation of microorganisms in the water, provided the irradiance and exposure duration are above a minimum "dose" level (often measured in units of microWatt seconds per square centimeter). Ultraviolet water disinfection units, such as those commercially available from Trojan Technologies Inc. under the tradename UV600, employ this principle to disinfect water for human consumption. Generally, water to be disinfected passes through a pressurized stainless steel cylinder which is flooded with ultraviolet radiation. Large scale municipal wastewater treatment equipment, such as that commercially available from Trojan Technologies Inc. under the tradename UV3000, employ this same principle to disinfect treated wastewater. Specifically, ultraviolet radiation emitting lamps are submerged in an open channel wherein the treated wastewater is exposed to radiation as it flows past the lamps. For further disclosure of fluid disinfection systems employing ultraviolet radiation see U.S. Pat. Nos. 4,482,809; 4,872,980 5,006,244; and 5,418,370, the contents of each of which is incorporated herein by reference.

In many applications it is desirable to monitor the level of ultraviolet radiation present within the water under treatment. In this way, it is possible to assess, on a continuous or semi-continuous basis, the level of ultraviolet radiation, and thus, the overall effectiveness and efficiency of the disinfection process.

It is known in the an to monitor the ultraviolet radiation level by deploying one or more passive sensor devices near the operating lamps in specific locations and orientations. These passive sensor devices may be photodiodes, photoresistors, or other devices that respond to the impingement of the particular radiation wavelength or a range of radiation wavelengths of interest by producing a repeatable signal level (in volts or amperes) on output leads.

Generally, the measurement of relatively high intensity radiation can be problematic due to the harshness of the environment in which the sensor device must be disposed and used. For instance, in an environment with a relatively high ultraviolet radiation level, an unprotected photodiode is subject to the immediate onset of rapid and irreversible degradation of the sensor device. Moreover the rate of degradation increases at increasing radiation levels. Degradation of the sensing device is characterised by reduced accuracy of the sensor device output signals, and eventually by outright failure of the sensor device.

One solution proposed to reduce degradation of the sensor device is to relocate the sensor device further from the radiation source. Practically, this creates other problems relating to geometry or size constraints of the sensor device and/or the fluid disinfection system.

Another solution proposed to reduce degradation of the sensor device in harsh environments involves the use of special filters and coatings for the radiation sensing device. One example involves the use of a filter glass that is placed between the radiation source and the sensor device in order to attenuate the radiation or to remove unwanted wavelengths, or both. In this case, the filter glass is separate from the sensor device. Unfortunately, the filter glass may, itself, be subject to degradation because of the radiation present or other influences associated with the environment which have a degrading effect. Further, the filtering effect provided may change over time, reducing the accuracy of the sensed values. Another example involves the precipitation of a phosphorus coating onto the face of the sensor device to provide a wavelength conversion effect thereby minimizing degradation of the sensor. Unfortunately, the phosphorous coating itself is subject to degradation along with the sensor device.

It would be desirable to have an optical radiation sensor device which has an improved resistance to the degradation that results from prolonged use in an ultraviolet radiation environment.

SUMMARY OF THE INVENTION

It is an object of the present invention to provide an optical radiation sensor device.

Accordingly, the present invention provides an optical radiation sensor comprising a housing having an inlet which allows radiation to enter the housing, and further comprising the following elements serially disposed after the inlet in the path of the radiation: attenuating aperture means, filter means and sensor means.

While the invention will be described with reference to an optical radiation sensor device for use in a fluid disinfection systems, it will be appreciated by those of skill in the an that the sensor device may be readily adapted for other applications. More specifically, the invention will be described with reference to an optical radiation sensor device for use in an ultraviolet radiation fluid disinfection system.

BRIEF DESCRIPTION OF THE DRAWINGS

Embodiments of the present invention will be described with reference to the accompanying drawings, in which like numerals refer to like parts and in which.

DETAILED DESCRIPTION OF THE PREFERRED EMBODIMENTS

Figure 1:
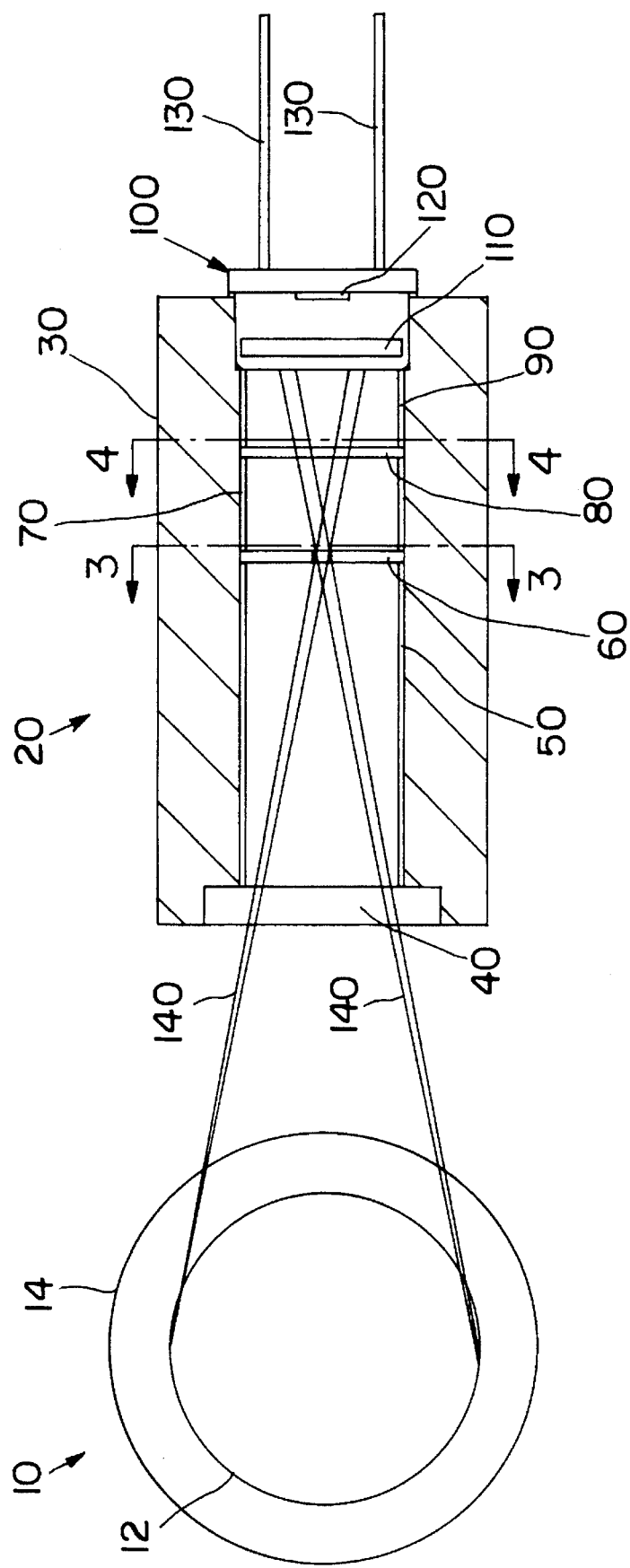
FIG. 1 illustrates a first embodiment of the optical radiation sensor device of the invention.

With reference to FIG. 1, there is illustrated an ultraviolet radiation lamp 10 comprising a lamp unit 12 and a protective quartz sleeve 14 surrounding lamp unit 12. Lamp 10, in normal operation, emits ultraviolet radiation having a wavelength of about 253.7 nanometers. Lamp 10 is commercially available from Voltarc (Connecticut) and Light Sources (Connecticut). Preferably, lamp 10 further comprises a protective quartz sleeve which defines a surrounding air layer (neither shown).

Adjacent to lamp 10, there is provided an optical sensor device 20. Sensor device 20 comprises a body 30. The end of body 30 which is nearest to lamp 10 comprises an inlet in which is disposed a quartz window 40. Within body 30 there is disposed, in series, a first spacer 50, an attenuating aperture disk 60, a second spacer 70, a baffle 80, a third spacer 90 and a radiation sensor 100. Radiation sensor 100 comprises a filter glass 110, a photodiode sensor 120 and electrical wiring 130 which connects sensor 120 to a suitable electronic circuit (not shown) for control or monitoring.

Quartz window 40 may be constructed of natural or synthetic quartz. Non-limiting examples of synthetic quartz are commercially available under the tradename SUPRASIL (Heraeus Amersil, Duluth, Ga.). Another example of quartz which may be use to construct quartz window 40 is clear fused silica, commercially available from General Electric Company under product number GE124/CFQ. Preferably quartz window 40 is constructed of synthetic quartz. Alternatively, it is possible to use, in place of quartz window 40, a window constructed of fused silica (e.g. VITREOSIL, commercially available from Thermal Syndicates (England)).

Attenuating aperture disk 60 and baffle 80 are preferably constructed from stainless steel which is relatively resistant to degradation from the radiation to which these elements are exposed.

Figure 4:
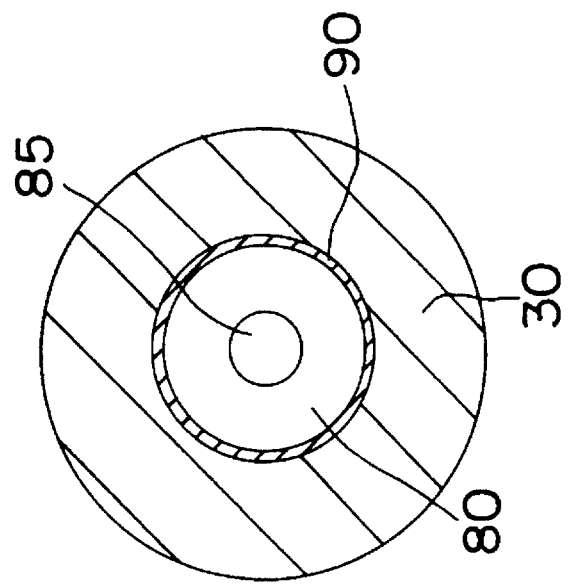
FIG. 4 is a sectional view along line 4—4 in FIG. 1.
Figure 3:
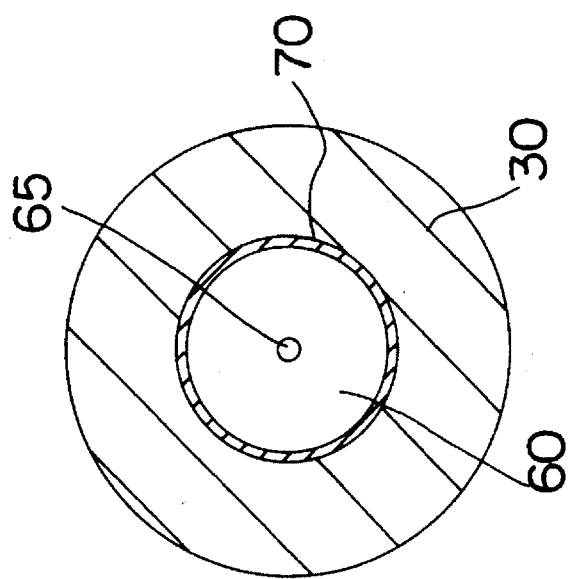
FIG. 3 is a sectional view along line 3—3 in FIG. 1.

Attenuating aperture disk 60 comprises a first aperture 65 (FIG. 3). Baffle 80 comprises a second aperture 85 (FIG. 4).

Figure 2:
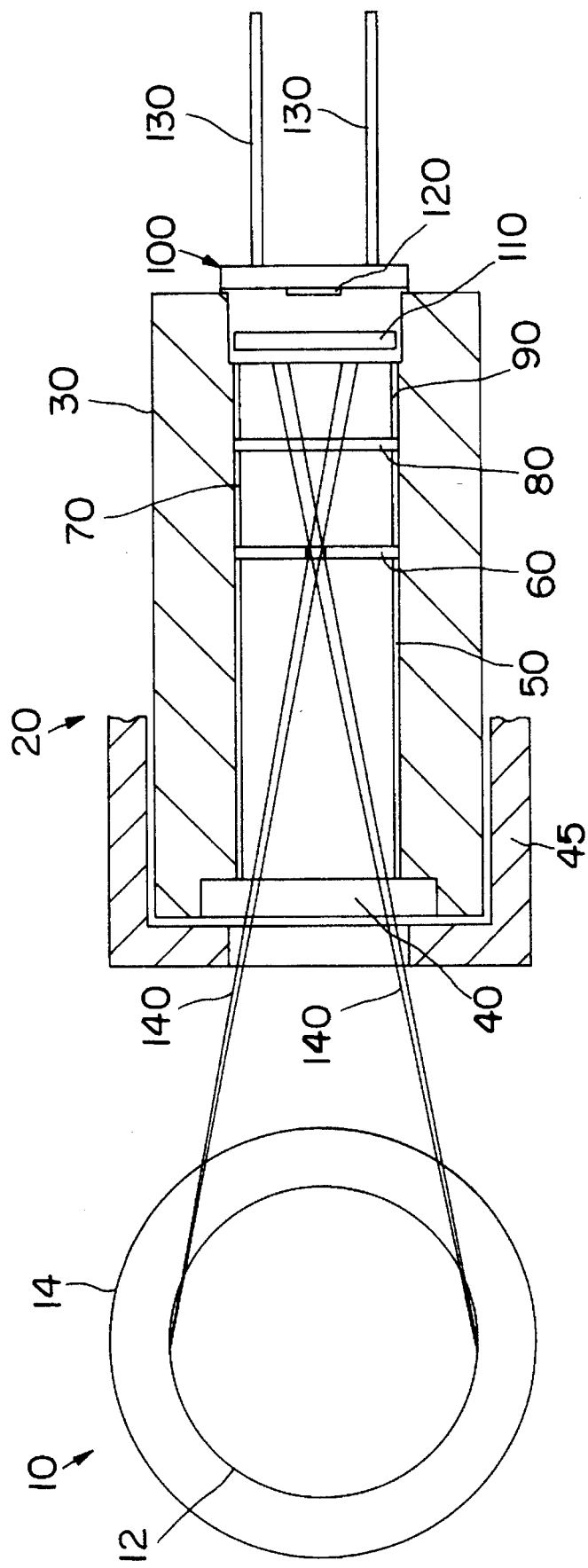
FIG. 2 illustrates a second embodiment of the optical radiation sensor device of the present invention.

FIGS. 1 and 2 illustrate optical filter 110 and photodiode sensor 120 as being integral in radiation sensor 100. The purpose of optical filter 110 is to remove any component of the incoming radiation having a wavelength in the visible region of the electromagnetic spectrum. This minimizes or eliminates the possibility of photodiode sensor 120 from sensing and reacting to visible radiation thereby generating false readings. It will be appreciated by those of skill in the art that optical filter 110 and photodiode sensor 120 need not be integral however this is the preferred configuration of radiation sensor 100.

Optical filter 110 may be constructed of a coloured glass filter. Such a filter is commercially available from Schott Glass Technologies Inc. (Duryea, Pa.). Alternatively, optical filter 110 may be constructed of an interference filter. Such a filter is commercially available from Baird Atomic.

Photodiode sensor 120 is preferably a photodiode which detects and responds to ultraviolet radiation. Such a photodiode is commercially available from United Detector Technology Components Group, UDT Sensors Inc. (Hawthorne, Calif.) and EG & G Optoelectronics, EG & G Canada Ltd. (Vaudreuil, Québec). Alternatively, it is possible to use as photodiode sensor 120 a photodiode which has a phosphorus coating thereon. In this case, the phosphorus coating converts the incoming radiation to visible radiation and the photodiode selected is one which will detect and respond to this type of radiation. Such a photodiode sensor is commercially available from Silonex Inc. (Montréal, Québec).

In sensor device 20, the components which are subject to performance-affecting degradation during the anticipated life of the device when exposed to ultraviolet radiation are the photodiode sensor 120 and optical filter 110. Sufficient degradation of these components results in reduced accuracy of the monitoring signals and failure of radiation sensor 100 thereby necessitating servicing and/or replacement of components or the entire assembly.

The remaining components of sensor device 20 are manufactured from materials that are not readily susceptible to degradation upon prolonged exposure to ultraviolet radiation. Such materials included stainless steel (for body 30, spacers 50, 70 and 90, baffle 80 and attenuating aperture disk 60), high quality quartz (for window 40) and selected adhesives (not shown) for securing the components and sealing the assembly.

In a similar manner, these principles may be used to apply the invention in other embodiments involving measurement of destructive radiation. Thus, it is generally preferred to select for the radiation sensor those materials which in use provide the best combination of low cost and resistance to damage during the anticipated product lifetime.

Through judicious selection, within the purview of a person skilled in the art, the diameter of quartz window 40, the diameter of attenuating aperture disk 60, the diameter of baffle 80, the spacing between quartz window 40 and ultraviolet lamp 10 and the lengths of the spacers 50, 70 and 90 are chosen to provide an optical pathway 140 as illustrated in FIG. 1. As optical pathway 140 progresses through sensor device 20, only a small portion of the radiation passes through attenuating aperture disk 60 to reach radiation sensor 100. As a result, the radiation that reaches radiation sensor 100 is fully representative of the light level at the quartz window 40 but is significantly attenuated. The rate of degradation of optical filter 110 and photodiode sensor 120 of radiation sensor 100 is directly determined by the magnitude of radiation that reaches them. Attenuation of the destructive radiation level through in this manner serves to prolong the life of radiation sensor 100, while not sacrificing accuracy or the advantage of optimum placement of sensor device 20 with respect to ultraviolet lamp 10.

The placement of lamp 10, quartz window 40 and attenuating aperture disk 60 may be designed as follows. Initially, it is necessary to set a design objective which will result in the irradiance at radiation sensor 100 being reduced to a level which is commensurate with the desired lifetime of radiation sensor 100. Typically, one would set the design objective as a fraction of the irradiance at the radiation sensor at a fixed closed proximity (e.g. 1 cm) to lamp 10. Thereafter, by knowing the active surface area of photodiode sensor 120 and the distance of lamp 10 to quartz window 40 it is possible to empirically determine the optimal placement of quartz window 40, attenuating aperture disk 60 and photodiode sensor 120 with respect to one another.

For this application, optimum performance is achieved if contamination (including moisture) of sensor device 20 is minimized or eliminated. In constructing sensor device 20, it is preferred that all internal components and surfaces thereof be cleaned with low-residue solvents or distilled deionized water and are air dried. Assembly of the components to produce sensor device 20 is accomplished through permanent adhesion of quartz window 40 into body 30, followed by placement and adhesion, in order, of spacer 70, attenuating aperture disk 60, spacer 70, baffle 80 and spacer 90.

Another consideration to be observed in the construction of sensor device 20 is sealing. Depending on the type of application of sensor device 20, an adhesive material used may have an organic or other component susceptible to degradation when directly subjected to the destructive radiation being monitored. Also, it is desirable that liquids in the monitored area not reach electrical wiring 130 of photodiode sensor 100 since this may cause damage. To this end, the sealing of sensor device 20 should be considered carefully and will be further discussed with reference to FIG. 2.

With reference to FIG. 2, prior to insertion of quartz window 40 into body 30, a suitable adhesive is placed in the accommodating groove (not shown) disposed in body 30. After the adhesive is solidified and cured, spacer 50 is inserted into body 30, with adhesive either applied in the interstitial space between spacer 50 and body 30 (or, alternatively, on the interior wall of body 30 to the end of the spacer 50). Subsequent insertion and adhesion of attenuating aperture disk 60, spacer 70, baffle 80 and spacer 90 are accomplished in a similar fashion, all at or amount the same time as the installation and adhesion of the spacer 50. Once all of all interior components (spacers 50, 70 and 90, attenuating aperture disk 60 and baffle 80) are in place, and the supporting adhesive is solidified and cured, the interior of body 30 is flooded with dry air or nitrogen to remove all moisture and radiation sensor 100 is inserted into body 30 with a full and continuous circumference application of a suitable sealing adhesive.

The end of sensor 20 having quartz window 40 is inserted in a mounting port 45. The inside diameter of mounting port 45 is selected so as to have a tight sliding fit with the outside diameter of body 30. The size of the opening defined in the centre of mounting port 45 is selected so that no direct exposure of potentially destructive radiation can reach the adhesive applied to hold quartz window 40 into place in body 30. Similarly, the application locations for the adhesives which retain the interior stainless steel components (spacers 50, 70 and 90, attenuating aperture disk 60 and baffle 80) are not exposed to direct radiation. In order to sufficiently protect electrical wiring 130 from damage resulting from exposure to the liquid in the monitored environment, a suitable seal must be provided between mounting port 45 and the outside diameter of body 30. The choice of how to accomplish this depends upon resistance of available sealing materials to the fluid medium being purified and also on the desired permanency of the seal. For the illustrative application discussed herein, accommodating lands (not shown) for an O-ring (not shown) are designed into mounting port 45 and body 30. The O-ring is suitably compressed by a locking nut (not shown).

It should be understood that, while exemplary embodiments of the present invention have been described herein, the present invention is not limited to these exemplary embodiments and that variations and other alternatives may occur to those of skill in the art without departing from the intended scope of the invention as defined by the attached claims. For example, it is contemplated that the use of one or more of spacers 50, 70 and 90 may be avoided by designing the interior of body 30 to have shoulders at the points at which attenuating aperture disk 60 and baffle 80 are to be disposed. Thus, in this modification the diameter of the interior of body 30 increases in a step-wise manner progressing from quartz window 40 to radiation sensor 100. Another contemplated modification relates to the use of means other than adhesive to affix quartz window 40 and, if present, spacers 50, 70 and 90. Yet another modification contemplated by the inventors is elimination of baffle 80 by roughening of the interior of body 30 thereby reducing the amount of stray radiation to which radiation sensor 100 is exposed. Yet another modification contemplated by the inventors is the use of more than one aperture in attenuating aperture disk 60 and, if present, baffle 80.

What is claimed is:

1. An optical radiation sensor comprising:

a housing having an inlet which allows radiation to enter the housing;

attenuating aperture means disposed in said housing, for attenuating radiation passing through said inlet;

filter means capable of removing visible radiation from radiation passing through said aperture means;

sensor means capable of detecting and responding to ultraviolet radiation passing through said filter means; and stray radiation reducing means comprising an uneven surface disposed along an interior surface of said housing and off a radiation path, for reducing the amount of stray radiation reaching said sensor means.

2. The sensor defined in claim 1, wherein said filter means and said sensor means are integral.

3. The sensor defined in claim 1, wherein said inlet comprises a quartz window.

4. The sensor defined in claim 1, wherein each of said inlet, said attenuating aperture means and said filter means are separated by spacers.

5. The sensor defined in claim 3, wherein said inlet further comprises a mounting port partially covering said quartz window.

6. The sensor defined in claim 1, wherein said filter means comprises an optical filter.

7. The sensor defined in claim 1, wherein said body is constructed of stainless steel.

8. The sensor according to claim 1, wherein said filter means comprises a colored glass filter.

9. The sensor according to claim 1, wherein said sensor means comprises a photodiode.

10. The sensor according to claim 1, wherein said housing is substantially free of moisture.

11. The sensor according to claim 1, wherein said stray radiation reducing means comprises a roughening of the interior of said housing.

\* \* \* \* \*